Patented Mar. 31, 1931

1,799,140

UNITED STATES PATENT OFFICE

ELTON R. DARLING, OF DECATUR, ILLINOIS, AND HOWARD F. MacMILLIN, OF MOUNT GILEAD, OHIO, ASSIGNORS TO THE HYDRAULIC PRESS MANUFACTURING COMPANY, OF MOUNT GILEAD, OHIO

MANUFACTURE OF PECTIN SOLUTION FROM APPLE POMACE

No Drawing. Application filed September 6, 1927. Serial No. 217,874.

This invention relates to a method for the manufacture of pectin solution, from apple pomace particularly, which results in the production of a clear concentrated solution of pectin which may be used in the liquid form, or, if desired, reduced to powdered form.

Previous methods for the manufacture of pectin have involved a treatment of the apple pomace after the apple juice has been pressed therefrom in order to remove the sugars from the pomace, and a subsequent extraction with hot or boiling water in order to obtain the pectin solution. Such methods result in a solution which is frequently colored, or at least cloudy, and must be subjected to various treatments in order to obtain a clear colorless solution.

The process disclosed herein obviates many of the difficulties in previous processes, and results in the extraction of the pectin solution directly from the pomace by submitting the same to very high pressure. The process is particularly adapted for the treatment of pomace such as is obtained in the process for the manufacture of high grade apple juice disclosed in the patent to Elton R. Darling, No. 1,659,086 issued February 14, 1928, although it may be adapted for use with pomace obtained in other ways.

The process disclosed in said application consists in crushing the fruit in the ordinary manner and thereafter treating the crushed fruit with an enzyme in order to convert all of the starch into sugars. The crushed fruit is then subjected to the usual pressure, and the apple juice is extracted, together with substantially all of the fruit sugars. This leaves a pomace which has no sugars which must be either extracted by some separate step, or are extracted together with the pectin solution, giving the latter an undesirable sugar content and rendering the same more or less of a syrup.

The pomace resulting from the above process is placed in a hydraulic press and submitted to a pressure of up to five hundred pounds for the purpose of removing a further amount of palatable apple juice without removing such materials as might be valuable for still other purposes than apple juice.

The pressed pomace is then run through a pomace picker, and there is added ten per cent of its weight in boiling water. It may be found desirable to add about 2.5% of vinegar based on the weight of the pomace, although this is not necessary for the manufacture of a satisfactory pectin solution. It may be noted that the relatively small amount of hot water added is for the purpose of assisting in the working of the mass, and to act as a carrier of the pectin concentrate when the pomace is pressed. The volume is so small that the temperature of the whole mass of pomace is not materially raised, and there is no hot extraction of pectin solution.

After the pomace and water have been worked for a few minutes, it is then subjected to a pressure of one thousand pounds or more in a suitable hydraulic press, and this will extract the pectin solution.

The extraction is obtained solely by the pressure, and the pectin is not extracted by the use of boiling water or by any chemical treatment.

Since the pomace was treated to convert the starch into sugars prior to the pressing for the removal of the apple juice, there is practically no sugar remaining in the pomace which is submitted to high pressure for the purpose of obtaining the pectin solution. The solution is therefore a clear water-white liquid which is not syrupy in consistency, as is the case when fruit sugars are present therein. No coloring matter is contained in the pectin solution, because there has been no oxidation or chemical changes in the liquid. Moreover, owing to the relatively small amount of water added, the solution is quite concentrated, and if necessary may not be concentrated any further before use. If desired, however, part of the water may be removed in order to concentrate the solution still further, or it may be reduced to the form of a powder.

It will be noted that the principal features of the invention in its preferred form include a further pressing under high pressure of the usual pomace, the breaking up of the pomace and working with a relatively small amount of water, and the further pressure of the resulting mixture under a much higher pressure than has been previously applied to the pomace. It is to be noted, however, that various details may be modified or changed without in any way departing from the spirit of the invention, and this is to be understood as limited only by the scope of the appended claims.

We claim as our invention:

1. A process for the manufacture of pectin solution from apple pomace, which comprises subjecting the pomace to high pressure to remove any remainder of palatable juice, breaking up the pomace, adding to the pomace not more than 10% by weight of hot water, and subjecting the mixture to a much higher pressure to express the pectin from the pomace.

2. A process for the manufacture of pectin from apple pomace from which the apple juice has been expressed in the usual manner, which comprises subjecting the pomace to high pressure to remove any remainder of palatable juice, breaking up the pomace, adding to the pomace not more than 10% by weight of hot water, and subjecting the mixture to a pressure of 1000 pounds or more to express the pectin from the pomace.

3. A process for the manufacture of pectin, which comprises treating the crushed apples with an enzyme to convert the starch into sugar, pressing the crushed apples in the usual manner to remove the apple juice and fruit sugar, subjecting the resulting pomace to a higher pressure to remove any remainder of palatable juice, breaking up the pomace and mixing with a small amount of hot water, and subjecting the mixture to a much higher pressure to express the pectin from the pomace.

In testimony whereof, I have hereunto subscribed my name.
           ELTON R. DARLING.

In testimony whereof, I have hereunto subscribed my name.
           HOWARD F. MacMILLIN.